United States Patent
Grek

(10) Patent No.: US 8,902,619 B2
(45) Date of Patent: Dec. 2, 2014

(54) ALGORITHMIC CURRENT SENSING AND SYSTEM VALIDATION FOR PULSE-WIDTH MODULATION BASED SWITCHED-MODE POWER SUPPLIES

(75) Inventor: Mark Grek, St. Johns, FL (US)

(73) Assignee: Siemens Industry, Inc., Alpharetta, GA (US)

(*) Notice: Subject to any disclaimer, the term of this patent is extended or adjusted under 35 U.S.C. 154(b) by 544 days.

(21) Appl. No.: 12/974,438

(22) Filed: Dec. 21, 2010

(65) Prior Publication Data

US 2011/0148378 A1    Jun. 23, 2011

Related U.S. Application Data

(60) Provisional application No. 61/288,593, filed on Dec. 21, 2009.

(51) Int. Cl.
- *H02M 7/5395* (2006.01)
- *H02M 3/335* (2006.01)
- *H02M 1/32* (2007.01)

(52) U.S. Cl.
CPC ............ *H02M 3/33507* (2013.01); *H02M 1/32* (2013.01)
USPC ......................................... 363/97; 363/21.18

(58) Field of Classification Search
USPC ........... 363/21.1, 21.11, 21.18, 41, 95, 97, 98
See application file for complete search history.

(56) References Cited

U.S. PATENT DOCUMENTS

| | | | |
|---|---|---|---|
| 5,166,870 A * | 11/1992 | Shimizu et al. | 363/41 |
| 6,381,151 B1 | 4/2002 | Jang | |
| 7,148,669 B2 | 12/2006 | Maksimovic et al. | |
| 7,545,132 B2 | 6/2009 | Borowy et al. | |
| 7,652,459 B2 | 1/2010 | Abu Qahouq et al. | |
| 2005/0168198 A1 | 8/2005 | Maksimovic et al. | |
| 2007/0210766 A1 | 9/2007 | Borowy et al. | |
| 2008/0203992 A1 | 8/2008 | Qahouq et al. | |
| 2009/0146635 A1 | 6/2009 | Burket | |
| 2009/0167269 A1 | 7/2009 | Qu | |
| 2009/0267582 A1 | 10/2009 | Prodic et al. | |
| 2010/0117616 A1 | 5/2010 | Qahouq et al. | |
| 2011/0031940 A1* | 2/2011 | Green | 323/205 |
| 2011/0032738 A1* | 2/2011 | Skinner et al. | 363/126 |
| 2011/0148378 A1* | 6/2011 | Grek | 323/283 |

FOREIGN PATENT DOCUMENTS

| | | |
|---|---|---|
| JP | S59103572 A | 6/1984 |
| JP | H10-14226 A | 1/1998 |

OTHER PUBLICATIONS

International Search Report issued in PCT/US2010/061592, mailed Sep. 1, 2011.
Written Opinion issued in PCT/US2010/061592, mailed Sep. 1, 2011.
P. Mattavelli, "Digital control of dc-dc Boost Converters with Inductor Current Estimation", IEEE, pp. 74-80 (2004).

(Continued)

*Primary Examiner* — Jeffrey Sterrett

(57) ABSTRACT

A power supply current monitor comprising a processor operable to monitor a pulsed voltage signal generated by a power supply and generate an alert when a pulse width for the pulsed voltage signal is outside an expected pulse width range; wherein the pulse width is dependent on an amount of current being supplied to a load by the power supply.

17 Claims, 20 Drawing Sheets

(56) References Cited

OTHER PUBLICATIONS

Guang Feng et al., "A New Digital Control Algorithm to Achieve Optimal Dynamic Performance in DC-to-DC Converters", IEEE Transactions on Power Electronics, vol. 22, No. 4, pp. 1489-1498 (Jul. 2007).

Great Britain Office Action mailed Mar. 11, 2014 corresponding to Great Britain Application No. 1210084.8 filed Dec. 21, 2010 (3 pages).

Translation of Spanish Office Action mailed May 21, 2014 corresponding to Spanish Application No. 201290051 filed Dec. 21, 2010.

* cited by examiner

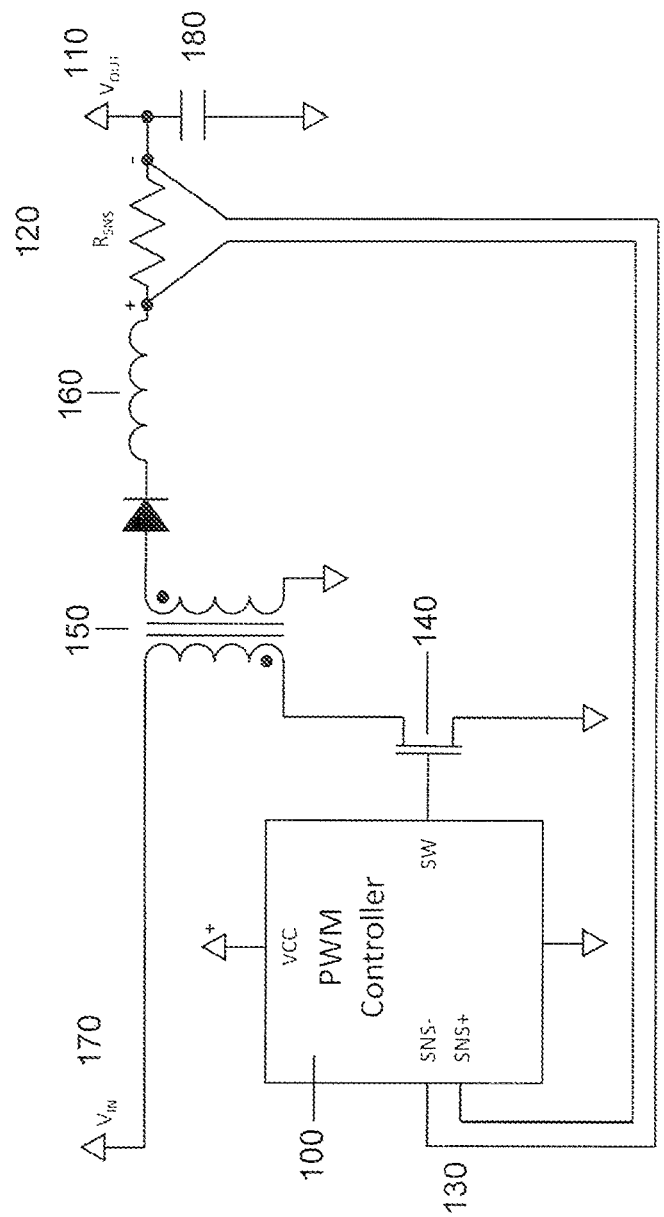

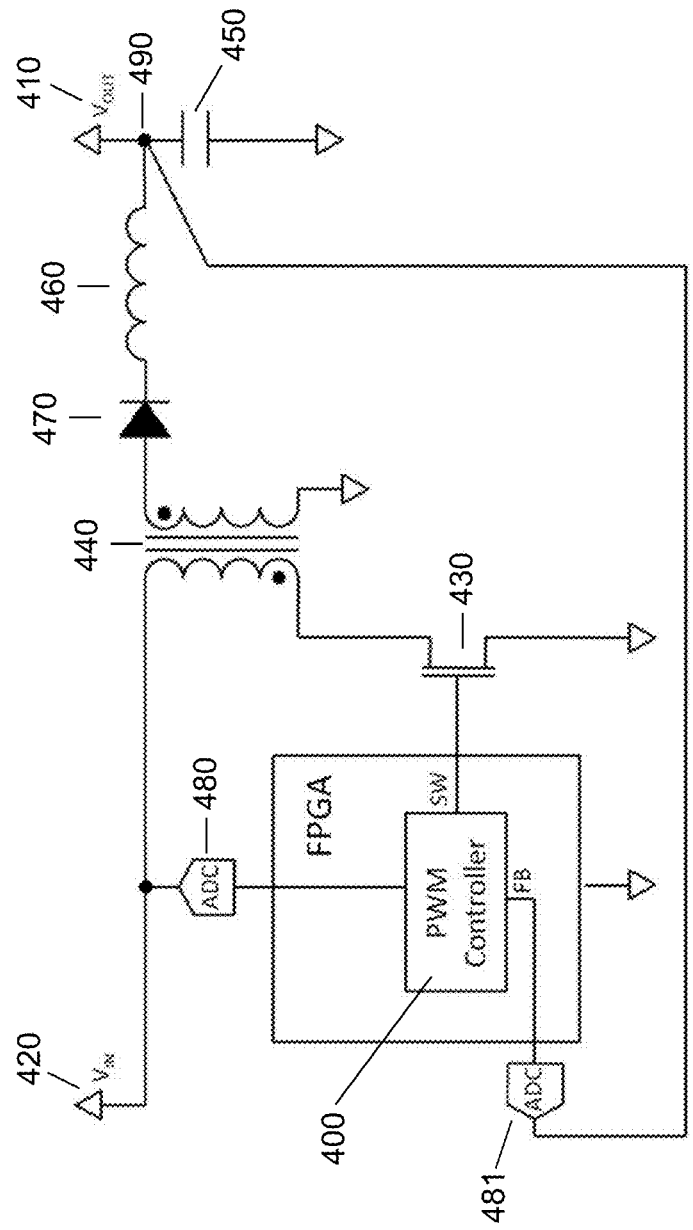

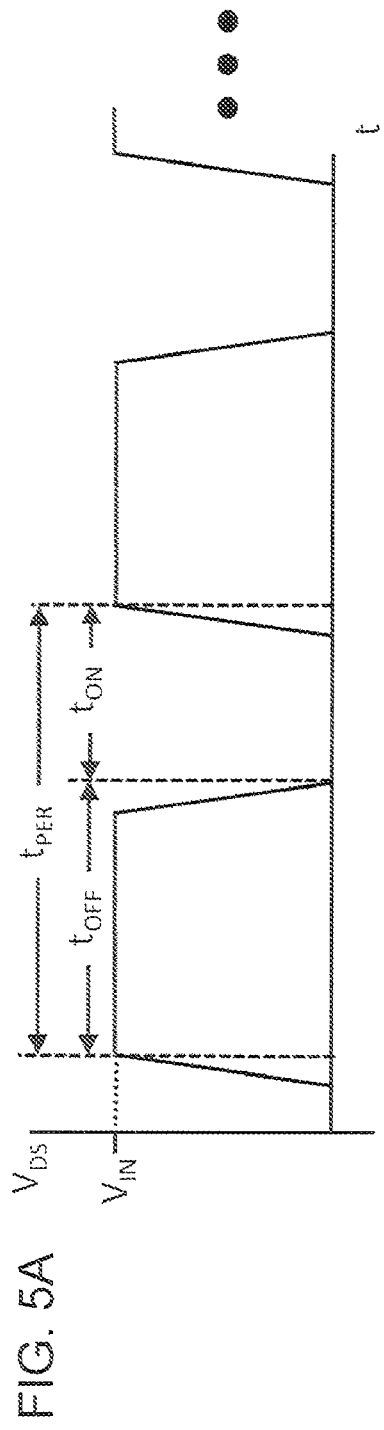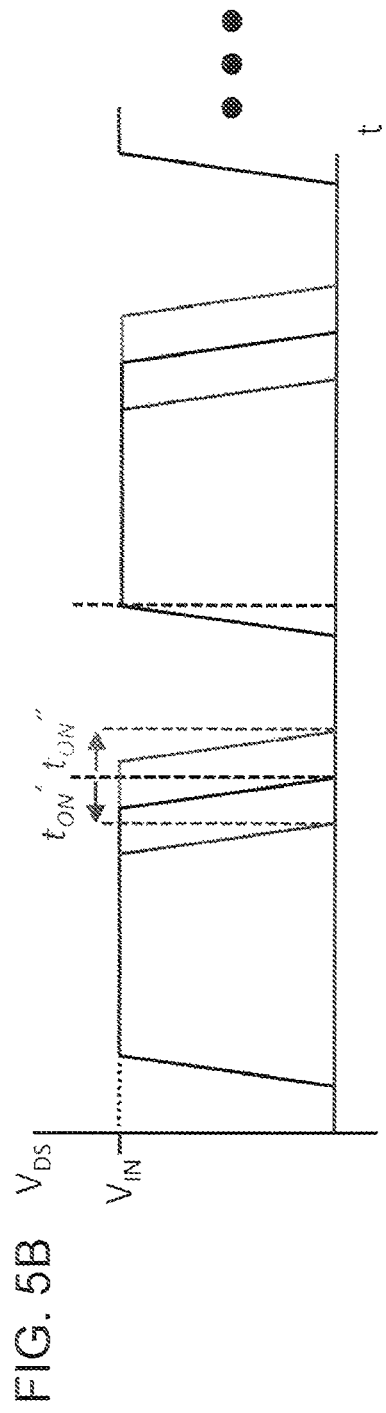
FIG. 5A
FIG. 5B

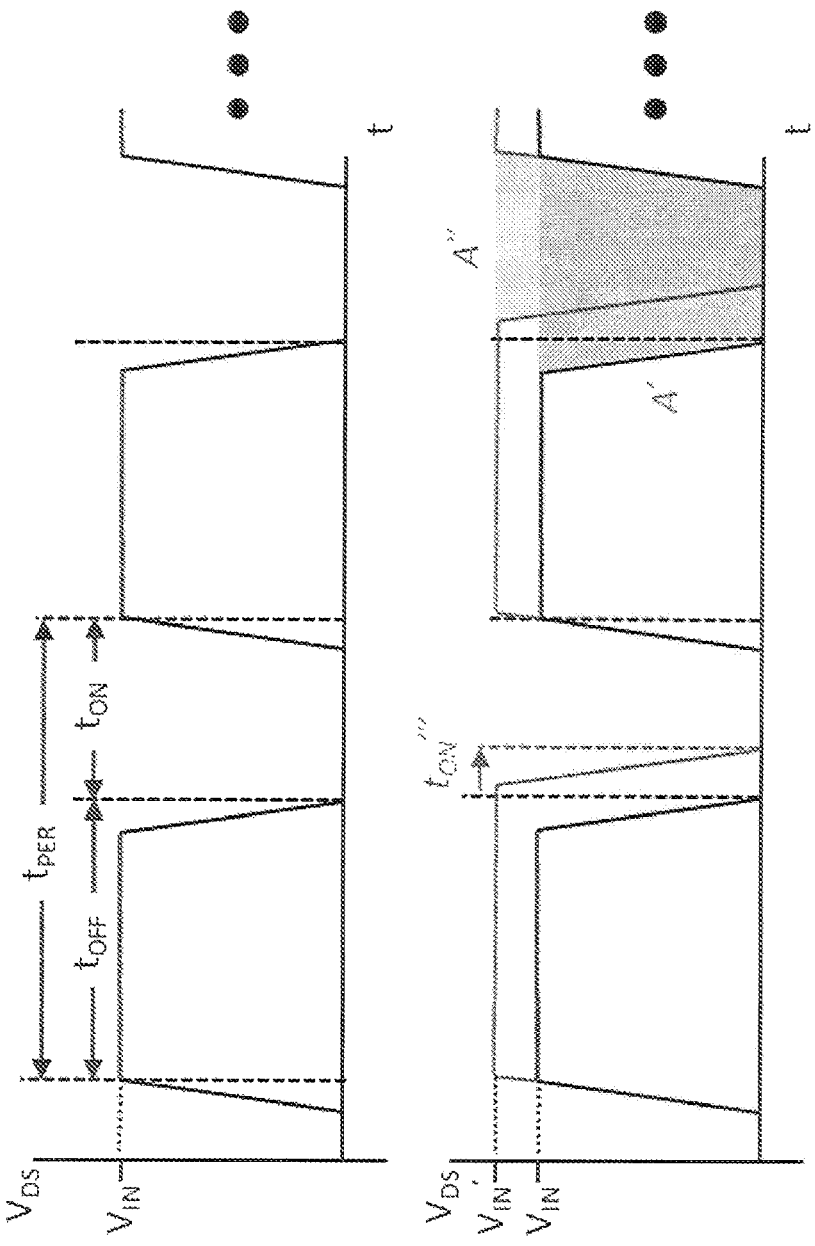

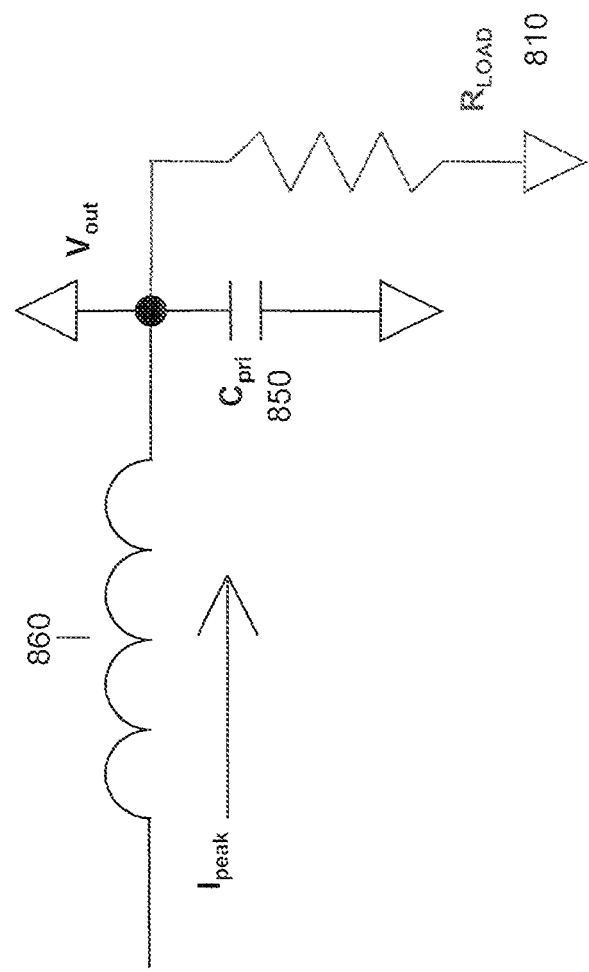

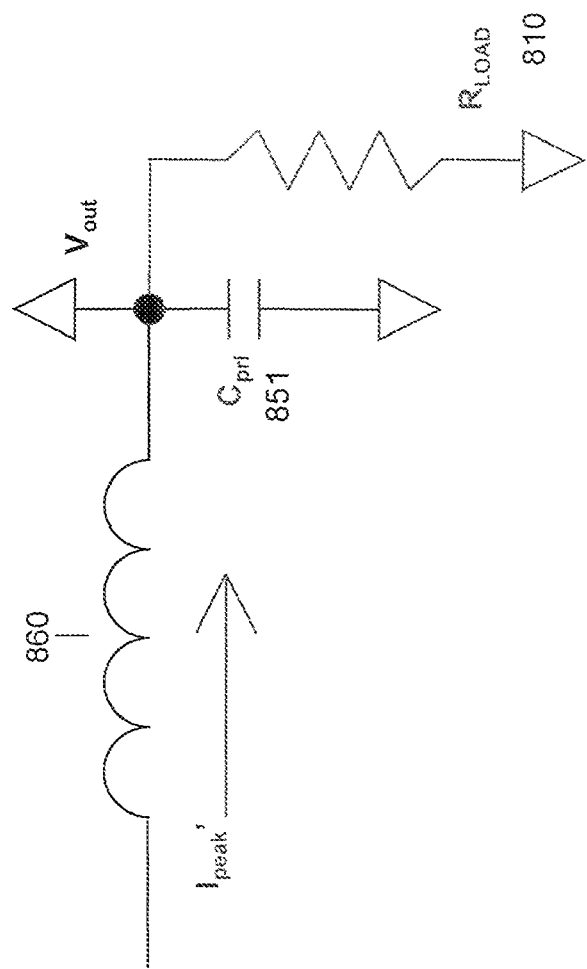

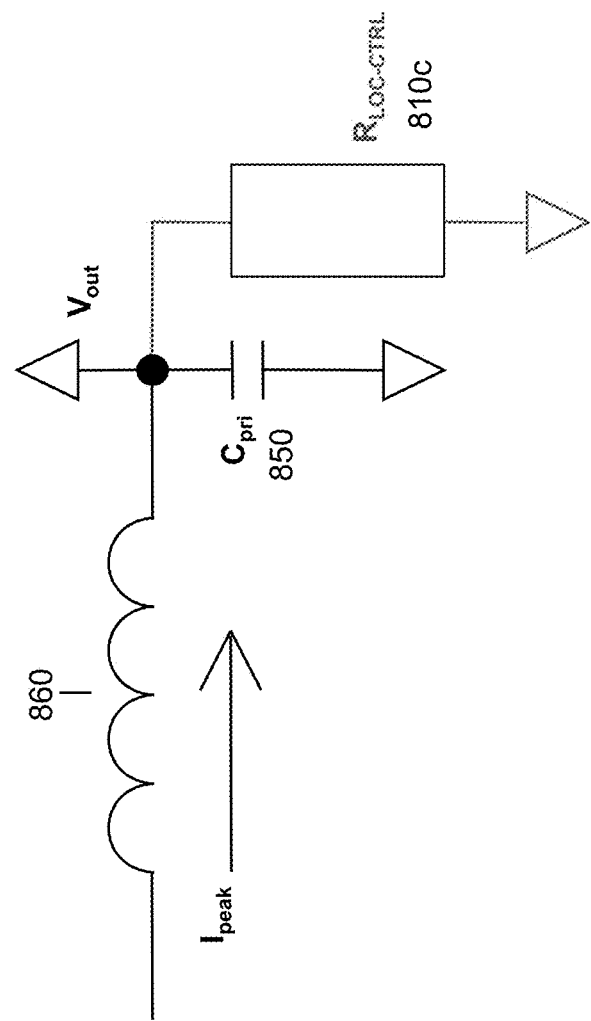

ALGORITHMIC CURRENT SENSING AND SYSTEM VALIDATION FOR PULSE-WIDTH MODULATION BASED SWITCHED-MODE POWER SUPPLIES

CROSS REFERENCE TO RELATED APPLICATIONS

This disclosure claims priority from U.S. Provisional App. Ser. No. 61/288,593, entitled "An Algorithmic Approach to PWM SMPS Current Sensing and System Validation," filed Dec. 21, 2009, the entirety of which is incorporated by reference herein.

BACKGROUND

Pulse-width modulation (PWM) based switched-mode power supplies (SMPS) are common power supplies used in a variety of applications. PWM SMPS devices may be self-contained power supply units or may be elements of circuits such as vital circuits used in the railroad industry. In a PWM SMPS, DC Power fed to a load is controlled by opening and closing a switch between the supply and load rapidly to form pulses of transmitted power. These pulses are conditioned by capacitors and/or inductors into an approximately linear DC signal. In PWM-based power supplies, load current measurement may be performed to rapidly detect overload states or loss of capacitance, or for general load monitoring. This monitoring is useful because in a typical power supply components are not expected to change over the operational life of the system. Therefore, detected changes in current for a given load may indicate problems such as capacitor failure. Capacitor failure may cause an increase in the equivalent series resistance (ESR) of the device, which in turn can cause increased heating and physical electrolyte leakage. Reduced capacitance may also impair feedback loop response of the circuit. Load current is often determined by one of several sensing techniques that require sense connections to components in the circuit.

One technique for monitoring load current in the prior art uses either a high-side or low-side sense resistor on the load itself to determine output current. For example, in the circuit of FIG. 1, the PWM controller 100 controls the switch 140. When the switch 140 is closed, source 170 causes current to flow through transformer 150, which in turn supplies current to an inductor 160. The inductor 160 and capacitor 180 condition the current before it reaches the load 110. A resistor 120 is inserted between the inductor 160 and the load 110. A voltage drop across the resistor 120 is detected by a power supply sensor 130 which may include an analog to digital converter or an analog threshold detector. The voltage detected by the sensor 130 can be connected to a comparator or amplifier to facilitate current level sensing or overload monitoring. From this measured voltage drop and the known resistance of the resistor 120, load current can be determined. This method may be reasonably accurate, but the added resistor 120 adds to component cost, heat dissipation, and output voltage drop.

FIGS. 2A and 2B depict another prior art load current monitoring technique wherein a sense resistor on the switching element or the parasitic resistance of the switching element itself is used to find the current. As in FIG. 1, the PWM controller 200 controls the switch 240. When the switch 240 is closed, source 270 causes current to flow through transformer 250. The transformer 250, which in turn supplies current to an inductor 260. The inductor 260 and capacitor 280 condition the current before it reaches the load 210. A resistor may be inserted between switching element 240 and ground at 220 as in FIG. 2A, or the parasitic resistance 225 of the switching element 240 may be used as in FIG. 2B. In either case, sensor 230 measures the voltage drop across the resistor 220 or 225 to ground. The voltage detected by the sensor 130 can be connected to a comparator or amplifier to facilitate current level sensing or overload monitoring. From this measured voltage drop and the known resistance of the resistor 220 or 225, load current can be determined. As with FIG. 1, the addition of a resistor 220 in FIG. 2A adds to component cost, heat dissipation, and output voltage drop. The parasitic resistance 225 of FIG. 2B does not contribute to these problems (because the switch 240 must be present in any case), however the parasitic resistance 225 cannot be precisely known because of component lot variations and environmental impact on its value.

A prior art current sensing technique that does not use resistance to detect current is shown in FIG. 3. The PWM controller 300 supplies power from source 380 through the activation of switches 360 and 370. The inductor 320 and capacitor 390 condition the current before it reaches the load 310. Sensor 350 monitors node voltages at the node 330 shared by the load 310, inductor 320, and capacitor 390 and the node 340 shared by switches 360 and 370 and inductor 320. These node voltages are measured at certain points in time with respect to the actuation of the switches 360 and 370, and forward current in inductor 320 can be approximated from these measurements. In this technique, noise on the nodes 330 and 340 can reduce the accuracy of the current approximation.

BRIEF DESCRIPTIONS OF THE DRAWINGS

FIG. 1 depicts a prior art load current monitoring circuit.
FIG. 2A depicts a prior art load current monitoring circuit.
FIG. 2B depicts a prior art load current monitoring circuit.
FIG. 3 depicts a prior art load current monitoring circuit.
FIG. 4A depicts a load current monitoring circuit according to an embodiment of the invention.
FIG. 4B depicts a load current monitoring circuit according to an embodiment of the invention.
FIG. 5A depicts a duty cycle waveform according to an embodiment of the invention.
FIG. 5B depicts a duty cycle waveform according to an embodiment of the invention.
FIG. 6A depicts a duty cycle waveform according to an embodiment of the invention.
FIG. 6B depicts a duty cycle waveform according to an embodiment of the invention.
FIG. 7 depicts a load current approximation curve according to an embodiment of the invention.
FIG. 8A depicts a portion of a load current monitoring circuit according to an embodiment of the invention.
FIG. 8B depicts a portion of a load current monitoring circuit according to an embodiment of the invention.
FIG. 8C depicts a portion of a load current monitoring circuit according to an embodiment of the invention.
FIG. 8D depicts a portion of a load current monitoring circuit according to an embodiment of the invention.
FIG. 8E depicts a duty cycle waveform according to an embodiment of the invention.
FIG. 9A depicts a monitored change in pulse width over time according to an embodiment of the invention.
FIG. 9B depicts a monitored change in pulse width over time according to an embodiment of the invention.
FIG. 10 depicts a monitored change in pulse width over time according to an embodiment of the invention.

DETAILED DESCRIPTION

An algorithmic approach to current sensing may eliminate the need for connections to sensing elements. The algorithmic approach may utilize inherent aspects of PWM systems that make these systems flexible for many power conversion applications. Note that the terms "PWM" and "power supply" in this disclosure may refer to any circuit operating in a similar manner to a dedicated PWM power supply, and are not limited to self-contained power supply units. Some examples of PWM systems may include vital rail control circuits such as locomotive controls (brakes, horns, bells, interlocks, etc.) and railroad wayside element (crossing arm gates, rail signal lights, crossing signals, interlocks, vital logic, etc.) controls. PWM-based power conversion systems, while maintaining a fixed output voltage, can compensate for changes of load at a given input voltage and/or drive a constant load while input voltage changes by adjusting the PWM duty cycle.

Figure 2A:
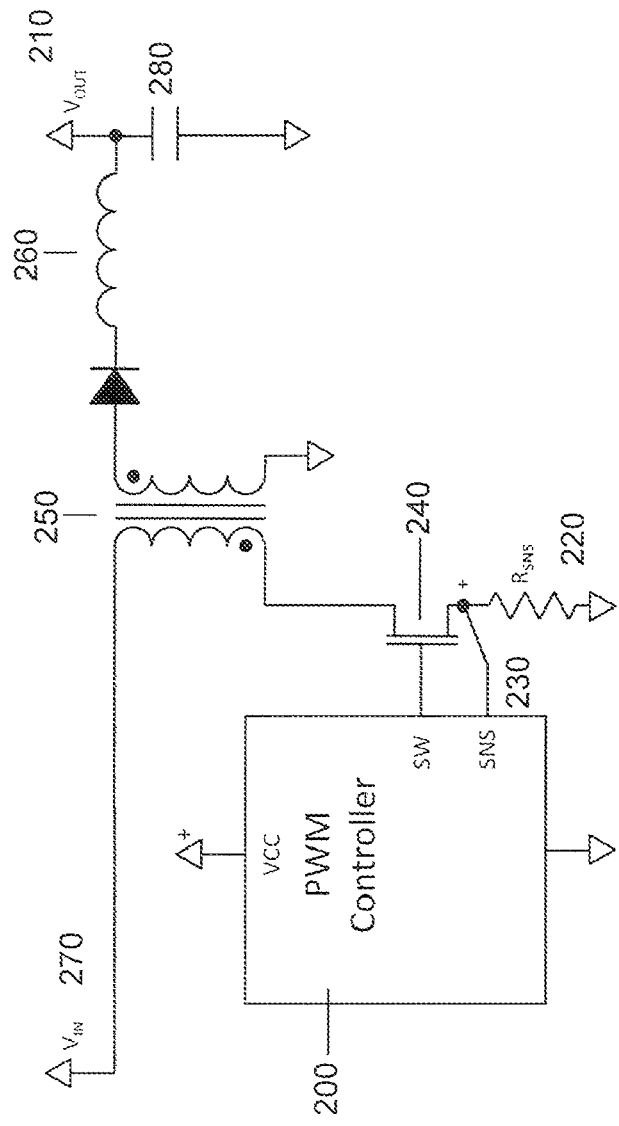
Figure 2B:
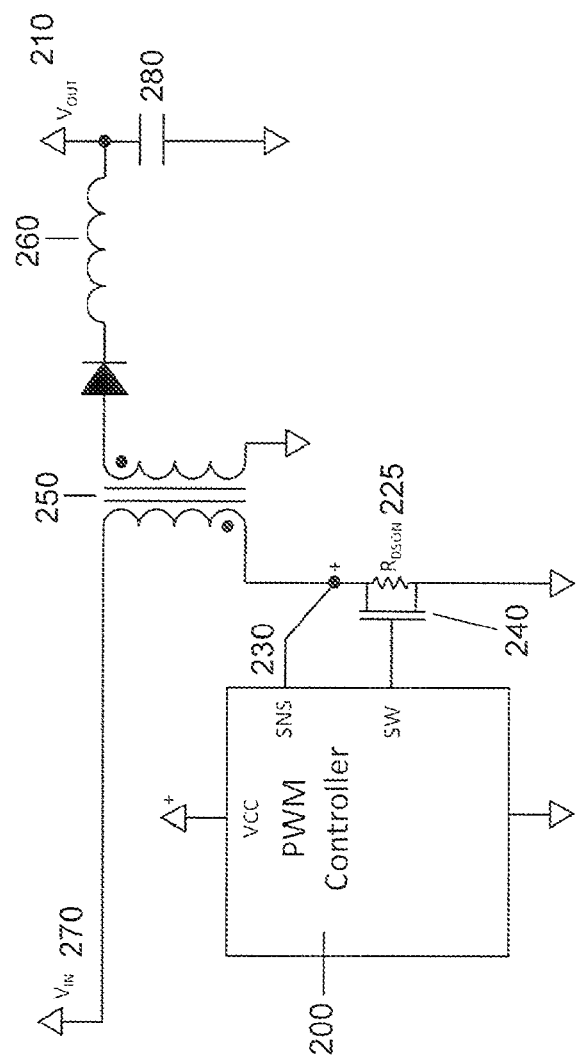
Figure 3:
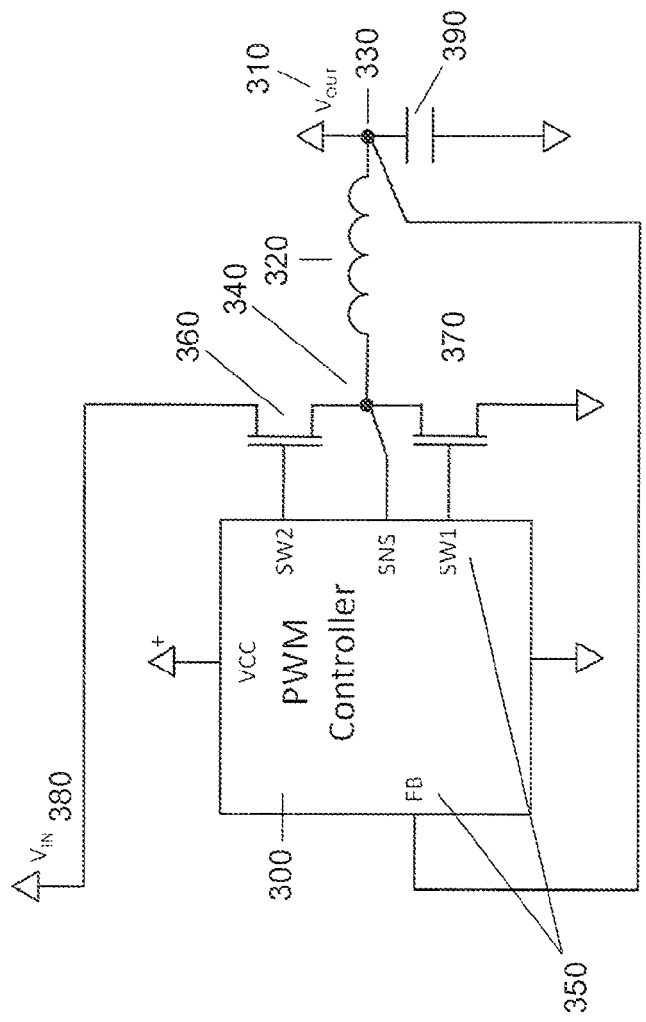
Figure 4B:
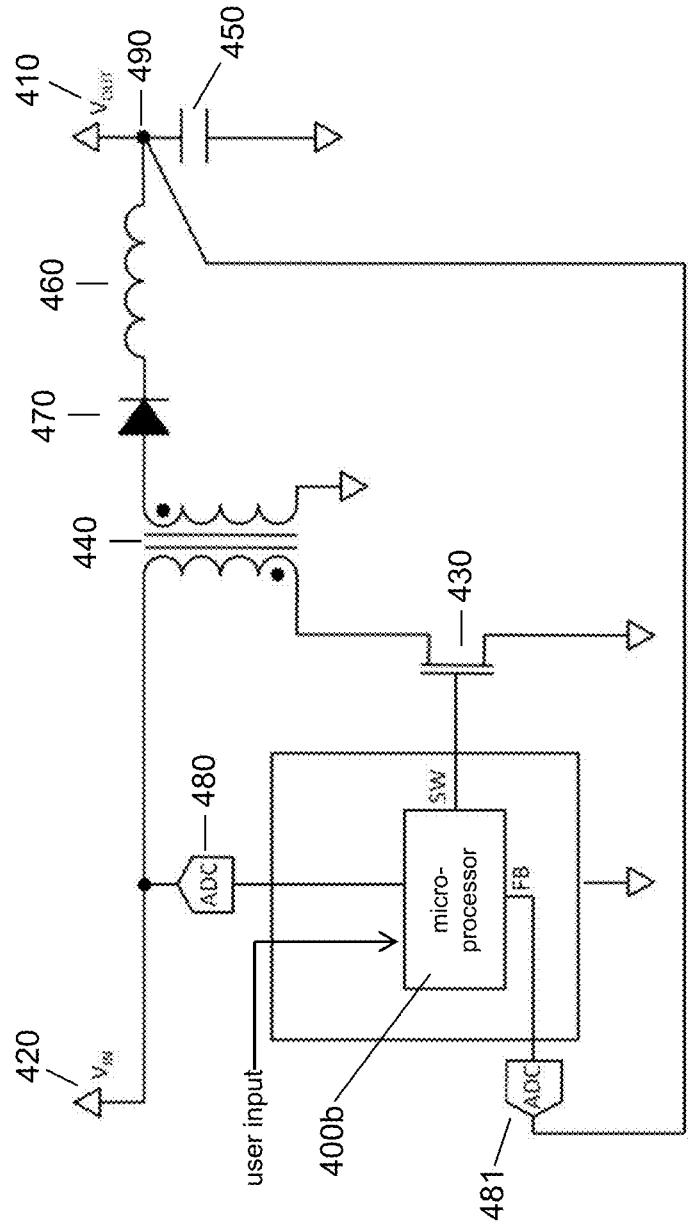

FIGS. 4A and 4B depict PWM circuits wherein current monitoring is performed without connections to sensing elements according to embodiments of the invention. These circuits are presented as examples only, and various components may be added, omitted, or changed in different embodiments of the invention. A PWM processor 400 may be provided. The processor 400 may be any type of processor, such as a programmable logic device (CPLD, FPGA, etc.) or hard silicon device (ASIC, microprocessor (e.g., microprocessor 400b of FIG. 4b), microcontroller, etc.). The processor (e.g., microprocessor 400b) may be configured to receive user inputs, as shown in FIG. 4B. In some embodiments, the processor 400 may control the switch 430. In other embodiments, the processor 400 may communicate with another device that controls the switch 430. When the switch 430 is closed, current from the source 420 may flow through the transformer 440. For example, source 420 may be a DC source providing a signal with constant voltage, however in some embodiments AC sources may be used. Opening and closing the switch 430 may produce signal pulses which may transition rapidly from a voltage of substantially zero volts to the constant voltage value of the source 420. Current may then flow from the transformer 440 through a diode 470 and/or an inductor 460 to node 490. At node 490, a capacitor 450 may be present to convert the pulsed signal from the transformer 440 into a substantially steady voltage for use by the load 410.

The output voltage supplied to the load 410 may be determined by the pulse width and the capacitance of capacitor 450. By opening and closing the switch 430 at different rates, the processor 400 may provide different voltages to the load 410. Given a known capacitance for capacitor 450 and a static load 410, the processor 400 may set an appropriate pulse width for a desired voltage output.

Figure 12:
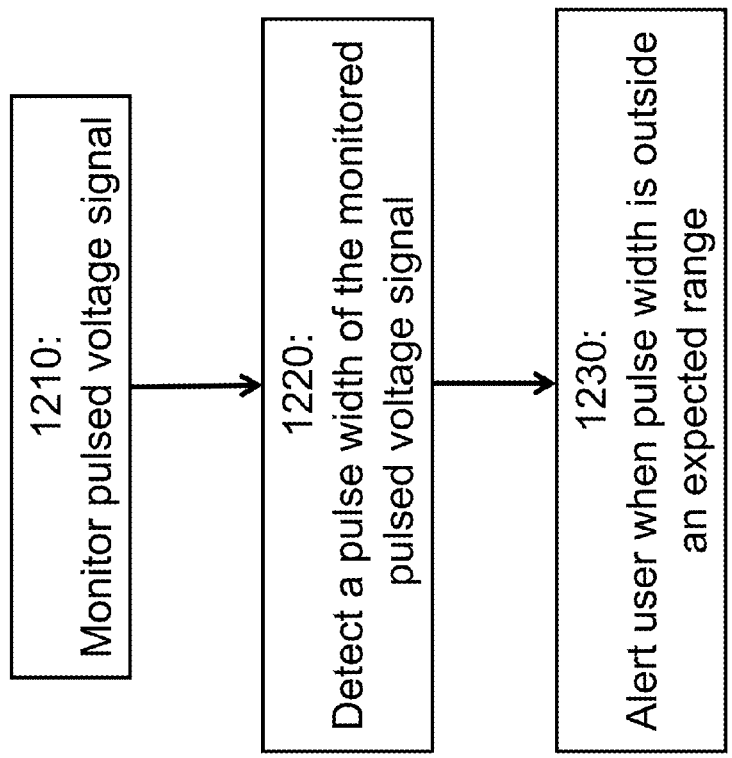
FIG. 12 depicts a pulse width monitoring method according to an embodiment of the invention.

Using input 480, the processor 400 may detect the input voltage. This voltage may be high when the switch 430 is open. When the switch 430 is closed, the detected voltage may rapidly fall to substantially zero volts as the signal is pulled down to ground through the transformer 440 and the closed switch 430. The processor 400 may also have a feedback input 481 connected to node 490 which may detect the voltage at node 490. Inputs 480 and 481 may feed detected signals to the processor 400 through an analog to digital converter or an analog threshold detector. Detecting the node 490 voltage may allow the processor 400 to adjust pulse width to supply a constant voltage to a dynamic load 410 or to set an expected pulse width range for a known load 410, as will be discussed below. An example of this process is depicted in FIG. 12. The processor 400 may monitor the pulsed voltage signal 1210. The processor 400 may detect a pulse width of the monitored pulsed voltage signal 1220. When the pulse width is outside an expected range, the processor 400 may alert a user 1230.

Figure 14:
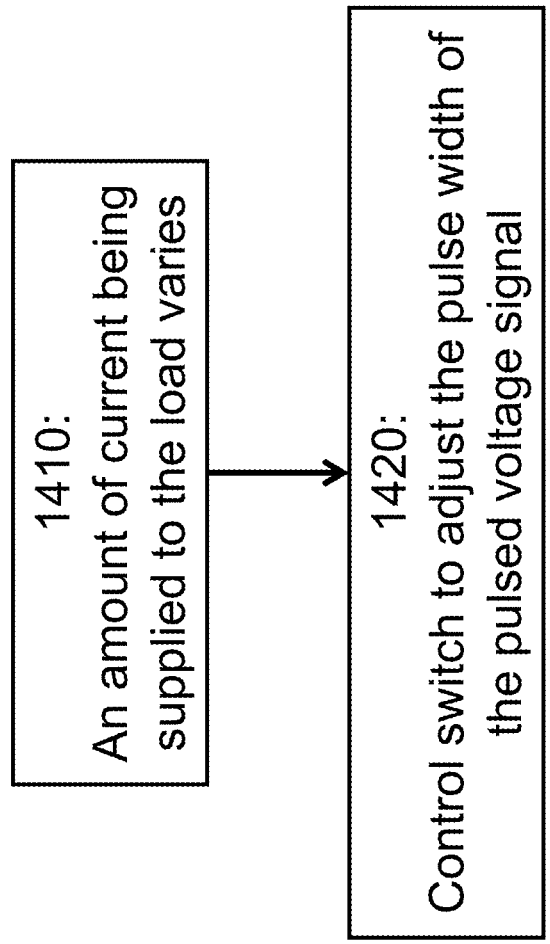
FIG. 14 depicts a pulse width adjustment method according to an embodiment of the invention.

The input 480 may supply the processor 400 with signals resembling those depicted in FIGS. 5A-6B. The changes made to the pulse widths in the examples of FIGS. 5A-6B may be sensed by the processor 400 through input 480. FIG. 5A shows a PWM drain-source voltage waveform according to an embodiment of the invention. This may be the voltage read by input 480 in the circuit of FIG. 4. The overall time period for one cycle is represented by $t_{PER}$. The portion of the period $t_{PER}$ for which the switch 430 is open is represented by $t_{OFF}$. While the switch 430 is open, the voltage may be at or near $V_{IN}$. The portion of the period $t_{PER}$ for which the switch 430 is closed is represented by $t_{ON}$. When the switch 430 is closed, the voltage may drop rapidly to approximately zero volts and remain there until the switch is reopened. When the switch 430 is reopened, the voltage may rise rapidly again to $V_{IN}$ and a new period $t_{PER}$ may begin. The duty cycle for the power supply may be the percentage of the period $t_{PER}$ during which the switch 430 is closed. For example, if the switch 430 is closed for the entire period $t_{PER}$, the duty cycle may be 100%. If the switch 430 is open for the entire period $t_{PER}$, the duty cycle may be 0%. As shown in FIG. 14, as an amount of current being supplied to the load varies 1410, the switch 430 may be controlled to adjust the pulse width of the pulsed voltage signal 1420.

FIG. 5B shows another drain-source voltage waveform according to an embodiment of the invention. This waveform demonstrates how a PWM supply may respond to a change in load characteristics. As the load characteristics change, the duty cycle may change proportionally. For example, if the load increases, $t_{ON}$ may move to $t_{ON'}$, resulting in a wider pulse width and more current passing through the transformer 440. If the load decreases, $t_{ON}$ may be reduced to $t_{ON''}$, resulting in a narrower pulse width and less current passing through the transformer 440.

PWM power supplies may also supply a constant load 410 with a constant voltage if $V_{IN}$ changes. FIGS. 6A and 6B are drain-source voltage waveforms according to an embodiment of the invention which demonstrate this. $V_{IN}$ may increase to $V_{IN'''}$. Correspondingly, $t_{ON}$ may be reduced to $t_{ON'''}$ to maintain the amount of energy transferred to the load 410. The constant energy (excluding parasitic system effects) may be represented by A', and for a constant load 410, A" with $\Delta V_{IN}$ may be approximately equal to A'.

Figure 7:
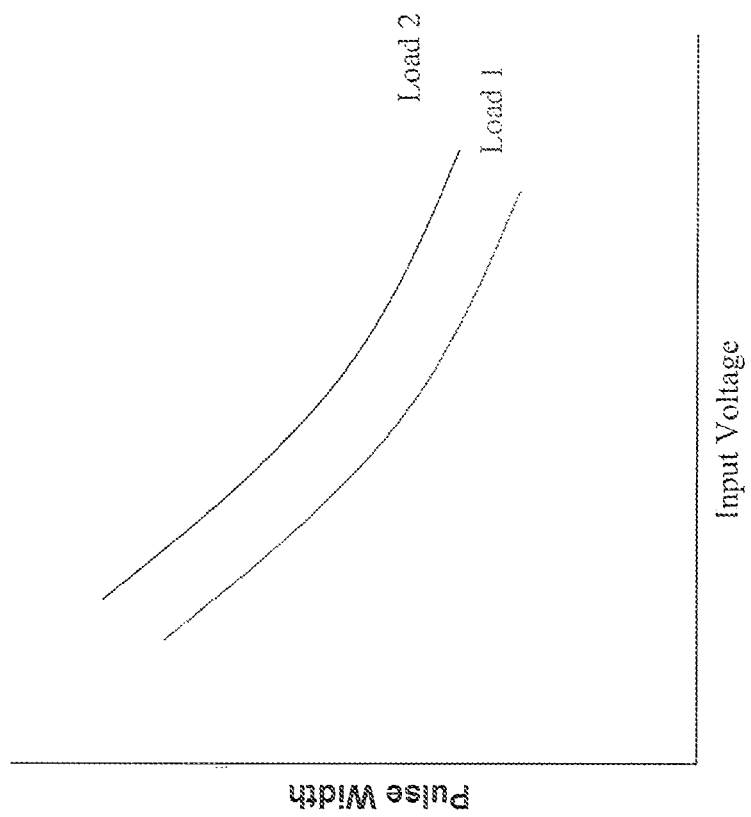

As FIGS. 5A-6B demonstrate, a PWM system may behave predictably when changes in load or input voltage occur. By factoring in changes in output voltage regulation variation, load current may be approximated with a best-fit curve. FIG. 7 depicts some best fit load current curves according to an embodiment of the invention. For an example PWM power supply, $V_{IN}$ pulse width values measured at input 480 may vary inversely with input voltage according to a similar curve for different loads. Therefore, a load curve for any load may be approximated with a best fit curve equation for a given PWM supply. For example, a polynomial of the form:

$$\text{Pulse Width Value} = (k_1 \times V_{IN}^2) - (k_2 \times V_{IN}) + k_3$$

may adequately characterize the current. This polynomial is presented as an example, and the appropriate equation may take on any form, depending on the characteristics of the power supply. Constants $k_1$, $k_2$ and $k_3$ may vary depending on the load. The processor 400 may use such an equation to monitor current without directly measuring current across a resistor.

Once a best-fit approximation is derived, the approximation can be used for many applications. For example, it may be used to implement load monitoring. An input voltage measured by the processor 400 from input 480 may be used to determine a theoretical pulse width value at which the system is operating above or below a threshold. For example, a maximum load threshold may be established by measuring $V_{IN}$ and computing a pulse width value for a given maximum load. Thereafter, a comparison of the theoretical and current pulse width value may determine if the system is operating over-capacity and/or if the system should continue to operate or be disabled.

Furthermore, for any constant load the pulse width may be monitored to determine aspects of system health. As discussed above, a PWM power supply may have energy storage elements such as inductors and capacitors for which the primary inductance and capacitance may be known. The scaling of the energy storage capacity of these elements may affect both the internal PWM functionality (loop stability, etc) and the capabilities of the SMPS itself (load/line regulation, transient response). The algorithmic pulse width monitoring may provide a window into the health of these energy storage elements.

Figure 8D:
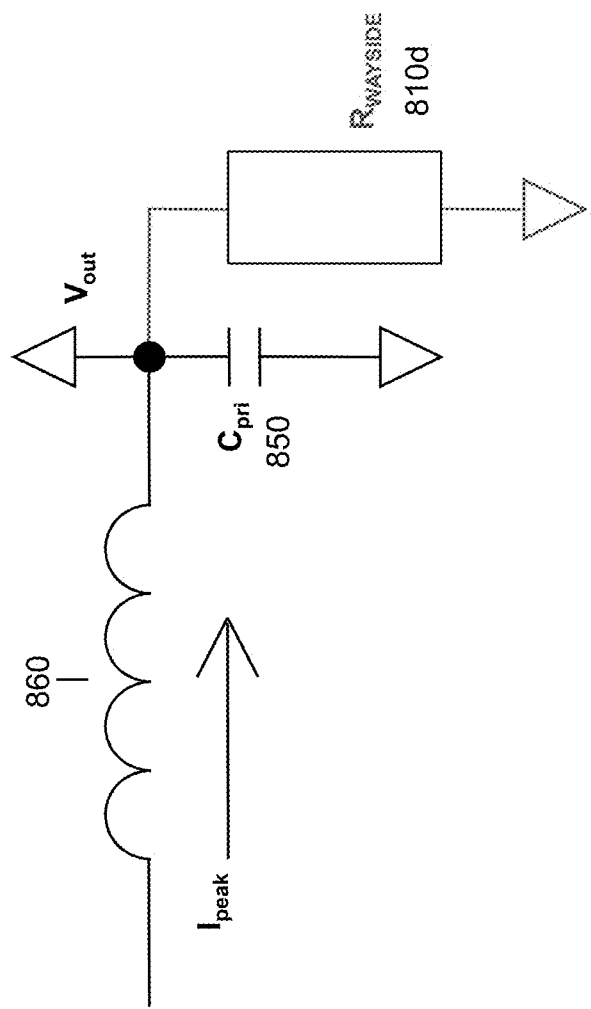
Figure 8E:
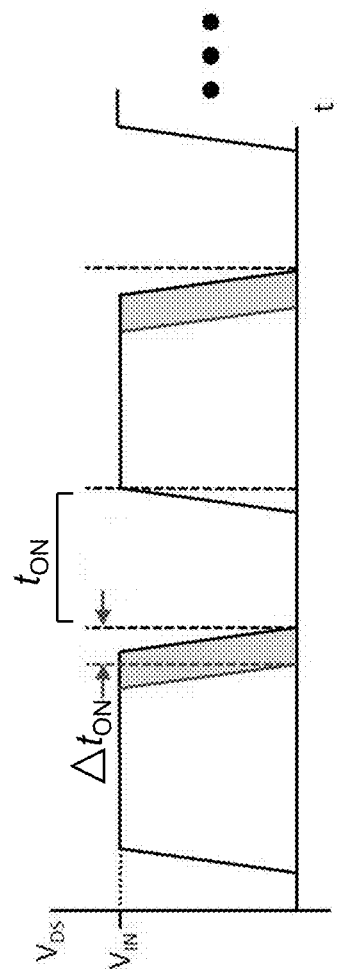

For example, if a load and input voltage remain constant while the pulse widths decrease, this may indicate that a capacitor is failing and has a reduced ability to store energy. The increased duty cycle may represent the power supply sending more pulses to keep output voltage substantially constant despite the loss of energy storage. FIGS. 8A-8E show an example of a change in capacitance affecting the duty cycle according to an embodiment of the invention. In FIGS. 8A and 8B, inductance $I_{PEAK}$ and load $R_{LOAD}$ may remain constant while capacitance $C_{PRI}$ decreases from FIG. 8A to FIG. 8B. This may cause peak currents delivered to the load to change. This change may be reflected in the monitored duty cycle of FIG. 8E, where $t_{ON}$ represents the period for which the switch is closed for the circuit of FIG. 8A and $\Delta t_{ON}$ shows the change when capacitance is reduced in FIG. 8B. Monitoring the pulse widths may reveal that $t_{ON}$ has increased and therefore current delivered to the load has increased. As the relationship of pulse width and current may be defined by the aforementioned techniques, changes to elements of the SMPS may be monitored. In embodiments wherein the system is aware that $R_{LOAD}$ may stay within a nominal value, the monitored pulse width value may be expected to remain substantially constant for the life of the power supply. If the pulse widths change in a manner indicative of a characterized function such as a gradual reduction in capacitance, then the algorithmic approach may alert a user of looming failure of primary capacitance in the SMPS. Note that the $R_{LOAD}$ may be any of a variety of loads, such as a locomotive control element load 810c as shown in FIG. 8C or a railroad wayside element load 810d as shown in FIG. 8D.

Figure 9A:
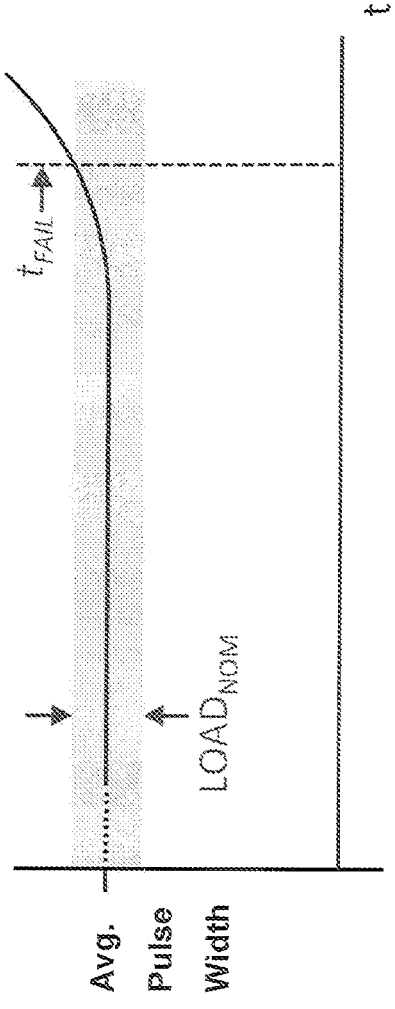
Figure 9B:
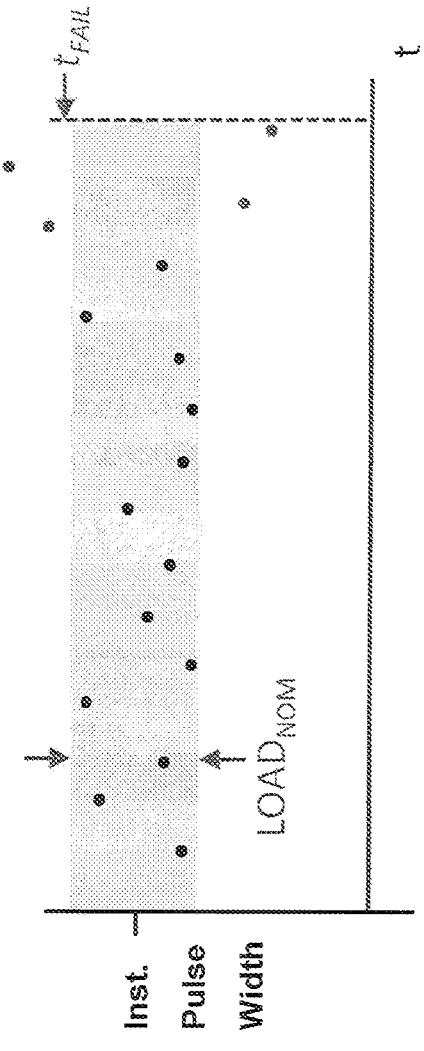

FIGS. 9A and 9B illustrate examples of how pulse widths may be monitored over time to detect component failures in embodiments of the invention. FIG. 9A is an example of a graph of pulse width monitored over time for a known load. A load may be characterized to continuously draw a known current within a range $LOAD_{NOM}$ that may be statistically determined. An average pulse width value may be monitored to determine if the current supplied to the load is within $LOAD_{NOM}$. If the pulse width value (and thus the current) passes a threshold, the system may interpret this as an error and may take corrective action such as providing alarms before the system fails. Setting the range $LOAD_{NOM}$ differently may allow different types of failure to be detected. For example, a relatively wide $LOAD_{NOM}$ may be useful for indicating when a capacitor has failed completely, while a relatively narrow $LOAD_{NOM}$ may be useful for determining that a capacitor has begun to fail but still has some capacitance.

FIG. 9B shows a similar monitoring method, wherein instantaneous samples of pulse width may be taken periodically. As in FIG. 9A, a load may be characterized to continuously draw a known current within a range $LOAD_{NOM}$ that may be statistically determined. Pulse width value may be sampled periodically to determine if the current supplied to the load is within $LOAD_{NOM}$. If the sampled pulse width value (and thus the current) falls outside a threshold, the system may interpret this as an error and may take corrective action such as providing alarms before the system fails.

In some embodiments, the range $LOAD_{NOM}$ can be characterized by the system itself. For example, the system may monitor pulse width changes within a given period and "learn" its own profile. Once a nominal profile has been determined by the system, deviations at a later point may trigger system alarms. In this case, the system may initially monitor pulse changes to determine if the current is typically constant, periodic, or constant with brief intervals of high or low pulses. The system may then empirically derive a nominal window $LOAD_{NOM}$ based on an initially monitored profile.

Figure 13:
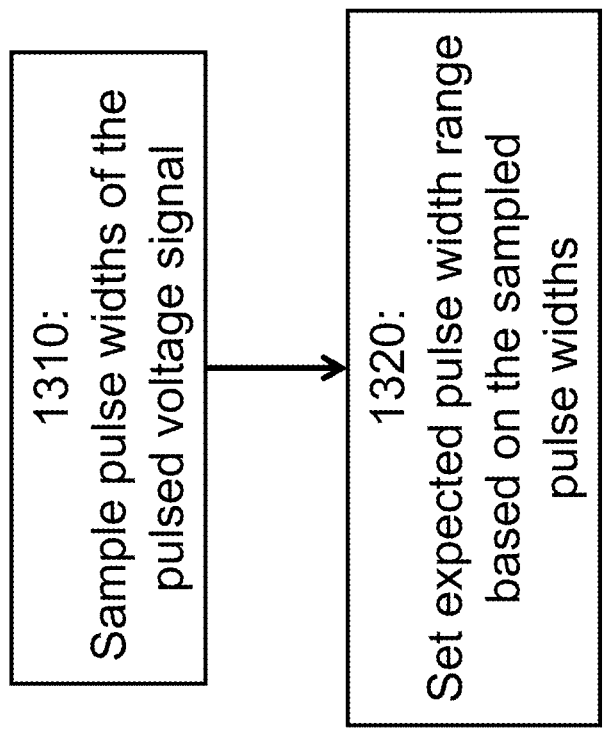
FIG. 13 depicts a pulse width range adjustment method according to an embodiment of the invention.

FIG. 13 depicts a pulse width range adjustment method according to an embodiment of the invention. As noted above, the pulse widths of the pulsed voltage signal may be sampled 1310, and the expected pulse width range may be set based on the sampled pulse widths 1320.

Figure 10:
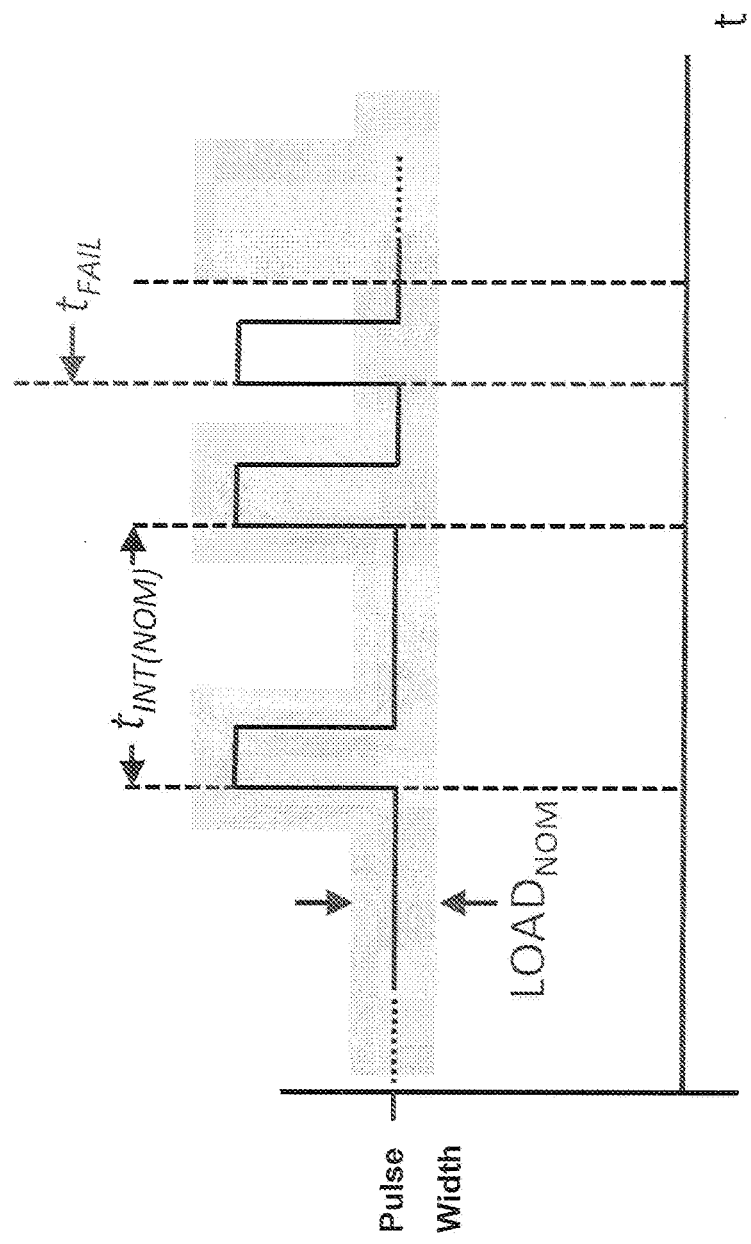

Additionally, the profile of a PWM system may be monitored for anomalies when periodic current spikes are expected. For example, the load may be a radio that is expected to transmit (and thus draw more current) on a regular interval basis. FIG. 10 depicts such an embodiment. If the current demand is expected to spike at periodic intervals, $LOAD_{NOM}$ may be defined to permit higher current at these intervals without triggering an alarm. This may allow the system to not only detect errors as in FIGS. 9A and 9B, but also to detect incorrect timing for expected current spikes.

Figure 11:
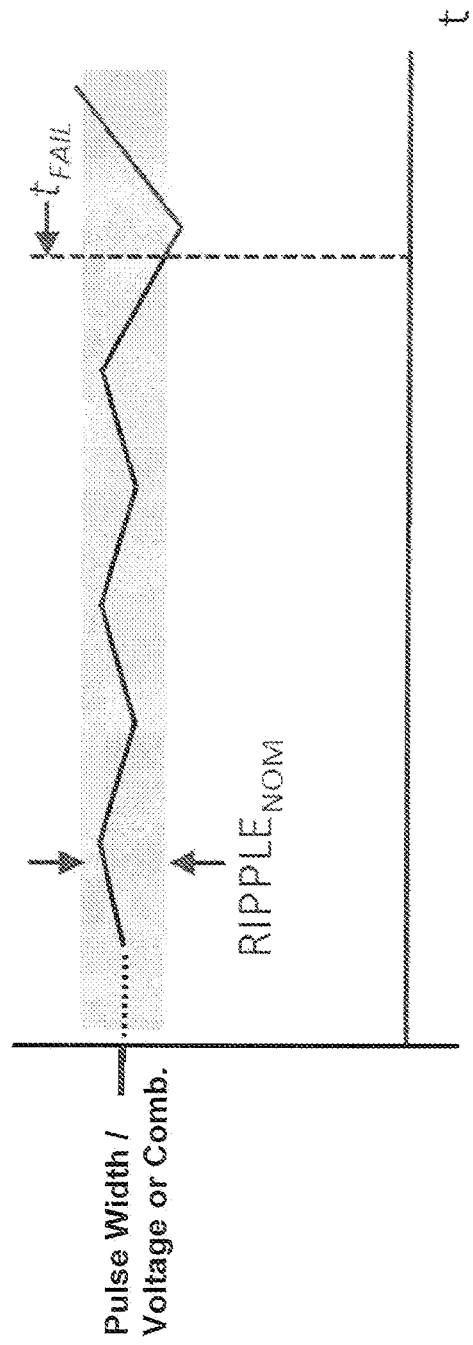
FIG. 11 depicts a monitored change in pulse width over time according to an embodiment of the invention.

Pulse width, input voltage, output voltage, and/or other parameters may be monitored simultaneously by the processor 400. In some embodiments of the invention, these parameters may be multiplied with the best fit current approximation equation by the processor. FIG. 11 depicts an embodiment of the invention wherein a pulse width and output voltage detected by a feedback input may be combined in this manner. Multiplying or dividing the pulse width by another signal such as output voltage may affect the shape of the curve. For example, FIG. 11 presents a ripple rather than the smooth line of FIG. 9A. However, embodiments of the invention may take these changes into account, for example by modifying the range $LOAD_{NOM}$ of FIG. 9A to the range $RIPPLE_{NOM}$ of FIG. 11 according to the changes made to the best fit current approximation equation. This may allow the processor to continue to monitor the pulse width value (and thus the current), even if other signals are monitored in addition to the pulse width.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it may be utilized in ways other than that shown.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

It should also be noted that the terms "a", "an", "the", "said", etc. signify "at least one" or "the at least one" in the specification, claims and drawings.

Finally, it is the applicant's intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

What is claimed is:

1. A power supply current monitor, comprising:
   a load;
   a switched mode power supply operable to supply DC current to the load via a pulsed voltage signal that is converted into a substantially steady voltage by a capacitor; and
   a processor operable to:
      monitor the pulsed voltage signal generated by the power supply;
      directly detect a pulse width of the monitored pulsed voltage signal from the monitored pulsed voltage signal; and
      alert a user when the detected pulse width of the monitored pulsed voltage signal is outside an expected pulse width range;
   wherein the switched mode power supply is configured to set the pulse width to maintain a substantially constant voltage when an amount of current being supplied to the load varies.

2. The power supply current monitor of claim 1, wherein the expected pulse width range is programmable by a user.

3. The power supply current monitor of claim 1, wherein the processor is operable to set the expected pulse width range based on a plurality of sampled pulse widths of the pulsed voltage signal.

4. The power supply current monitor of claim 1, wherein the expected pulse width range varies over time.

5. The power supply current monitor of claim 1, wherein the processor is operable to control a switch to adjust the pulse width of the pulsed voltage signal.

6. The power supply current monitor of claim 1, wherein the pulsed voltage signal is the product of a pulsed input voltage signal and an output signal.

7. The power supply current monitor of claim 1, wherein the load is a locomotive control element.

8. The power supply current monitor of claim 1, wherein the load is a railroad wayside element.

9. A method for monitoring power supply current, comprising:
   detecting, with a processor, a pulsed voltage signal generated by a power supply, wherein the pulsed voltage signal is converted into a substantially steady voltage by a capacitor and supplies a DC current to a load; and
   alerting a user, with a processor, when a detected pulse width of the detected pulsed voltage signal determined directly from the detected pulsed voltage signal is outside an expected pulse width range;
   wherein the pulse width is set by the power supply to maintain a substantially constant voltage when an amount of current being supplied to a load by the power supply varies.

10. The method of claim 9, further comprising setting the expected pulse width range based on input from a user.

11. The method of claim 9, further comprising:
    detecting a plurality of sampled pulse widths of the pulsed voltage signal; and
    setting the expected pulse width range based on the plurality of sampled pulse widths.

12. The method of claim 9, wherein the expected pulse width range varies over time.

13. The method of claim 9, further comprising adjusting the pulse width of the pulsed voltage signal.

14. The method of claim 9, wherein the pulsed voltage signal is the product of a pulsed input voltage signal and an output signal.

15. The method of claim 9, wherein the load is a locomotive control element.

16. The method of claim 9, wherein the load is a railroad wayside element.

17. A power supply current monitor, comprising:
    a processor operable to monitor a pulsed voltage signal generated by a power supply and alert a user when a detected pulse width of the detected pulsed voltage signal determined directly from the detected pulsed voltage signal is outside an expected pulse width range, wherein the pulsed voltage signal is converted into a substantially steady voltage by a capacitor and supplies a DC current to a load;
    wherein the pulse width is set by the power supply to maintain a substantially constant voltage when an amount of current being supplied to the load by the power supply varies.

* * * * *